US010793367B1

(12) United States Patent
Wedekind et al.

(10) Patent No.: US 10,793,367 B1
(45) Date of Patent: Oct. 6, 2020

(54) CONVEYING TABLE AND MODULE

(71) Applicant: Transnorm System Gmbh, Harsum (DE)

(72) Inventors: Daniel Wedekind, Giesen (DE); Rene Schaellig, Hildesheim (DE); Kai-Ulrich Ventz, Hildesheim (DE)

(73) Assignee: TRANSNORM SYSTEM GMBH, Harsum (DE)

( * ) Notice: Subject to any disclaimer, the term of this patent is extended or adjusted under 35 U.S.C. 154(b) by 0 days.

(21) Appl. No.: 16/748,207

(22) Filed: Jan. 21, 2020

(51) Int. Cl.
| | |
|---|---|
| *B65G 29/00* | (2006.01) |
| *B65G 25/08* | (2006.01) |
| *B65G 13/10* | (2006.01) |
| *B65G 47/80* | (2006.01) |
| *B65G 47/244* | (2006.01) |

(52) U.S. Cl.
CPC ............. *B65G 29/00* (2013.01); *B65G 13/10* (2013.01); *B65G 25/08* (2013.01); *B65G 47/80* (2013.01); *B65G 47/244* (2013.01); *B65G 2207/30* (2013.01); *B65G 2207/34* (2013.01); *B65G 2811/098* (2013.01); *B65G 2812/12* (2013.01)

(58) Field of Classification Search
CPC .... B65G 29/00; B65G 25/08; B65G 2207/30; B65G 2811/098; B65G 2812/12; B65G 13/10; B65G 47/80; B65G 47/244; B65G 2207/34
See application file for complete search history.

(56) References Cited

U.S. PATENT DOCUMENTS

| | | | | |
|---|---|---|---|---|
| 1,475,962 | A | | 12/1923 | Samuel |
| 4,004,681 | A | * | 1/1977 | Clewett ................ B65G 47/962 198/370.03 |
| 9,505,557 | B2 | * | 11/2016 | Wilkins ................ B65G 13/10 |
| 10,035,620 | B2 | * | 7/2018 | Pau ....................... B65G 47/244 |
| 2007/0284218 | A1 | | 12/2007 | Wallace et al. |
| 2013/0192954 | A1 | * | 8/2013 | Fourney ................ B65G 39/00 198/411 |
| 2016/0145053 | A1 | * | 5/2016 | Vetter .................... B65G 47/52 198/401 |

(Continued)

OTHER PUBLICATIONS

OCM Wheel Sorter, 2015, [online, Youtube Video] [ retrieved on Apr. 15, 2020] retrieved from the Internet URL: https://www.youtube.com/watch?v=PRS0Uj2WdpA, 4 pages.

(Continued)

*Primary Examiner* — Mark A Deuble
(74) *Attorney, Agent, or Firm* — Alston & Bird LLP

(57) ABSTRACT

Apparatuses, systems, and methods of manufacturing are described that provide a conveying module and conveying table for item transport. An example conveying module include a frame and an item transport plate that supports one or more items received thereon. The conveying module further includes a conveying drive motor supported by the frame and operably coupled to the item transport plate. The conveying drive motor causes rotation of the item transport plate about the conveying drive motor. The conveying module further includes a tilt adjustment mechanism that adjusts a tilt direction of the item transport plate relative to the frame. The conveying module also includes, in some instance, a tilt drive mechanism that controls operation of the tilt adjustment mechanism.

20 Claims, 5 Drawing Sheets

(56) References Cited

U.S. PATENT DOCUMENTS

2017/0121124 A1* 5/2017 Wilkins ............... B65G 13/065
2019/0135542 A1* 5/2019 Itoh ....................... B65G 43/00

OTHER PUBLICATIONS

Overmeyer et al., 2009, Interfaced Multidirectional Small-Scaled Modules for Intralogistic Operation [online article] [retrieved on Apr. 24, 2020] retrieved from the Internet URL: https://www.researchgate.net/publication/39018656_Interfaced_multidirectional_small-scaled_modules_for_intralogistic_operation, 12 pages.
Rotary Obliques Disk Mechanism, 2019, [online, Youtube Video] [retrieved on Apr. 15, 2020] retrieved from the Internet URL: https://www.youtube.com/watch?v=w2SmrvgiqQM, 4 pages.

* cited by examiner

CONVEYING TABLE AND MODULE

TECHNOLOGICAL FIELD

Example embodiments of the present invention relate generally to material handling systems and, more particularly, to systems and apparatuses for improved item conveying.

BACKGROUND

Warehouses, distribution centers, and other material handling environments often rely on a number of components, systems, and the like for transporting items to and from various locations within these environments. During movement of the items, various systems (e.g., conveyors, robotic arms, or the like) may be used to reorient, position, and/or redirect these items. However, the inventors have identified numerous deficiencies with these existing technologies in the field, the remedies for which are the subject of the embodiments described herein.

BRIEF SUMMARY

Apparatuses, systems, and associated methods of manufacturing are provided for conveying modules for item transport. An example conveying module may include a frame and an item transport plate configured to support one or more items received thereon. The conveying module may further include a conveying drive motor supported by the frame and operably coupled to the item transport plate. The conveying drive motor may be configured to cause rotation of the item transport plate about the conveying drive motor. The conveying module may also include a tilt adjustment mechanism configured to adjust a tilt direction of the item transport plate relative to the frame.

In some embodiments, the tilt adjustment mechanism may further include a tilt drive mechanism that controls operation of the tilt adjustment mechanism. The tilt adjustment mechanism may also include an eccentric joint configured to connect the conveying drive motor to the tilt drive mechanism such that an axis of rotation of a first drive shaft of the conveying drive motor is offset from an axis of rotation of a second drive shaft of the tilt drive mechanism. In such an embodiment, the frame may further include a deformable bearing supporting an end of the conveying drive motor proximate the first drive shaft. The deformable bearing may be configured to, during operation of the tilt drive mechanism, deform such that continuous contact between the frame and the conveying drive motor is maintained via the deformable bearing.

In some embodiments, the frame further may include a swivel surface supporting the item transport plate. In such an embodiment, the tilt adjustment mechanism may further include a plurality of pushrods positioned around the conveying drive motor and configured to abut the swivel surface. The swivel surface may also include a plurality of bearing cups each configured to receive a corresponding rounded end of a respective pushrod of the plurality of pushrods.

In a further embodiment, the conveying module may include a tilt drive mechanism configured to control operation of the tilt adjustment mechanism. The tilt adjustment mechanism may include a cam disk attached to the tilt drive mechanism that is shaped such that, when rotated by the tilt drive mechanism, the cam disk is configured to cause one or more of the plurality of pushrods to displace the swivel surface of the frame such that the item transport plate tilts relative to the frame.

In some embodiments, a first drive shaft of the conveying drive motor and a second drive shaft of the tilt drive mechanism are co-linear.

In any embodiment, the item transport plate may include a circular disk formed of a co-injected polymer.

A conveying table for item transport is also provided that includes a plurality of the conveying modules described above such that the plurality of conveying modules are configured to collectively convey items received by the conveying table.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Overview

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used herein, terms such as "front," "rear," "top," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

As used herein, the phrases "in one embodiment," "according to one embodiment," "in some embodiments," and the like generally refer to the fact that the particular feature, structure, or characteristic following the phrase may be included in at least one embodiment of the present disclosure. Thus, the particular feature, structure, or characteristic may be included in more than one embodiment of the present disclosure such that these phrases do not necessarily refer to the same embodiment.

As used herein, the word "example" is used herein to mean "serving as an example, instance, or illustration." Any implementation described herein as "example" is not necessarily to be construed as preferred or advantageous over other implementations.

Conveying Table

Figure 1:
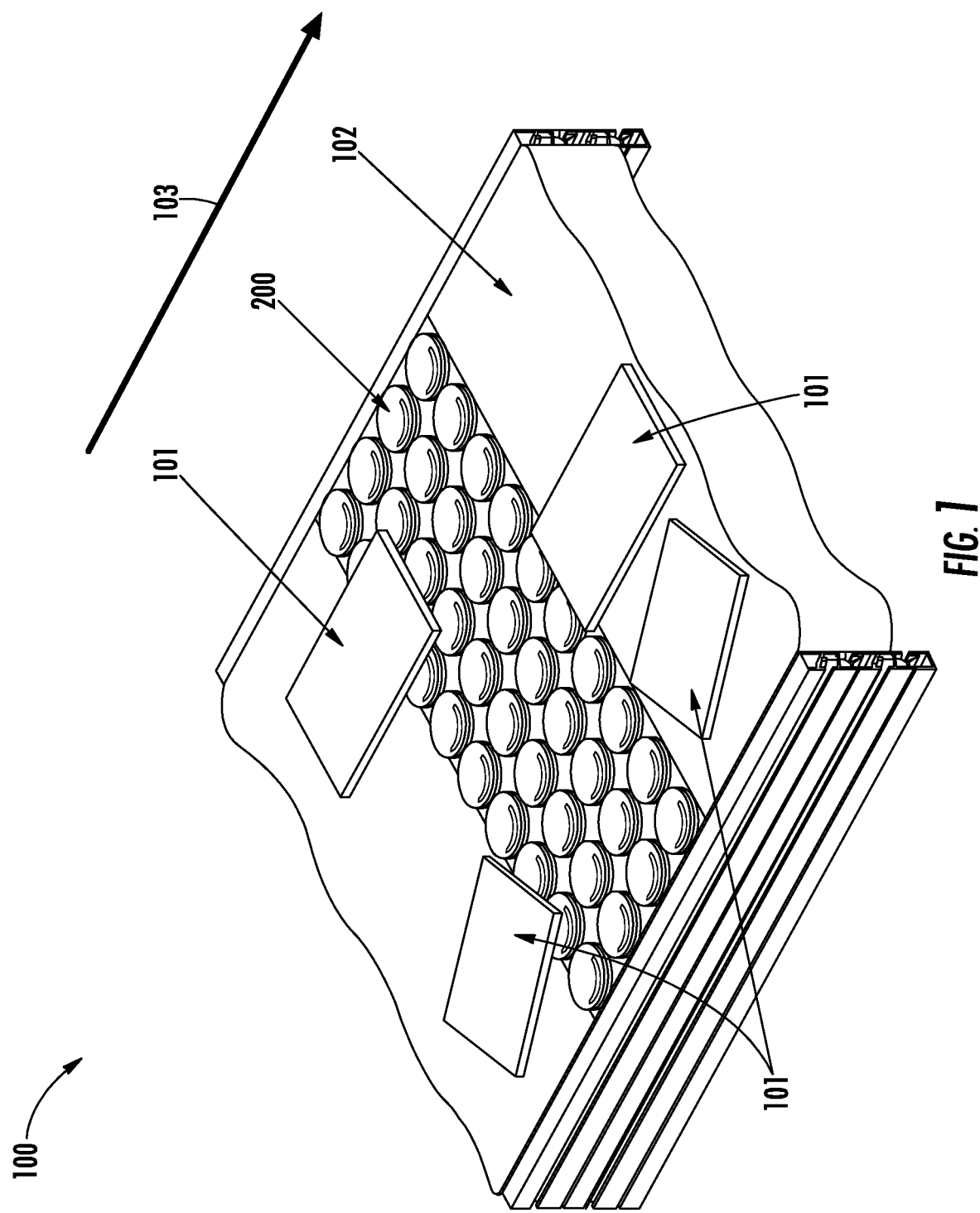
FIG. 1 is a perspective view of a conveying table according to an example embodiment.

With reference to FIG. 1, an example conveying table 100 is illustrated. As shown, the conveying table 100 is configured to support one or more items 101 (e.g., articles, packages, boxes, etc.) and to facilitate movement of these articles in a conveying direction 103. The conveying table 100 is illustrated with a friction belt 102 that operates as a carrying medium (e.g., endless loop between two pulleys or drums) and is configured to, when powered by a motor (not shown), move the one or more items 101 via contact and frictional engagement with these items 101. During movement of the items 101, however, one or more of the items 101 may need to be reoriented, redirected, and/or repositioned on the conveying table. For example, an item 101 may initially travel in the conveying direction 103 but require a change of direction (e.g., onto a different conveying table 100, onto a different frictional belt 102, and/or the like) in order to reach its intended destination. Similarly, an item 101 may include a barcode, or other readable indicia, that may be read by a scanner located proximate the conveying table 100. In an instance in which view of the barcode by the scanner is blocked, the item 101 may require repositioning. As such, the conveying table 100 may employ a plurality of conveying modules 200, for example, provided in a conveying module array comprising a plurality of conveying modules, as described hereafter with reference to FIGS. 2-5, in order to reorient, reposition, and/or redirect items 101 of the conveying table 100. Although illustrated with a conveying direction 103, the present disclosure contemplates that the conveying table 100 and associated devices described herein may operate to move items 101 supported by the conveying table 100 in any direction based upon the intended application of the conveying table 100.

Conveying Modules

Figure 2:
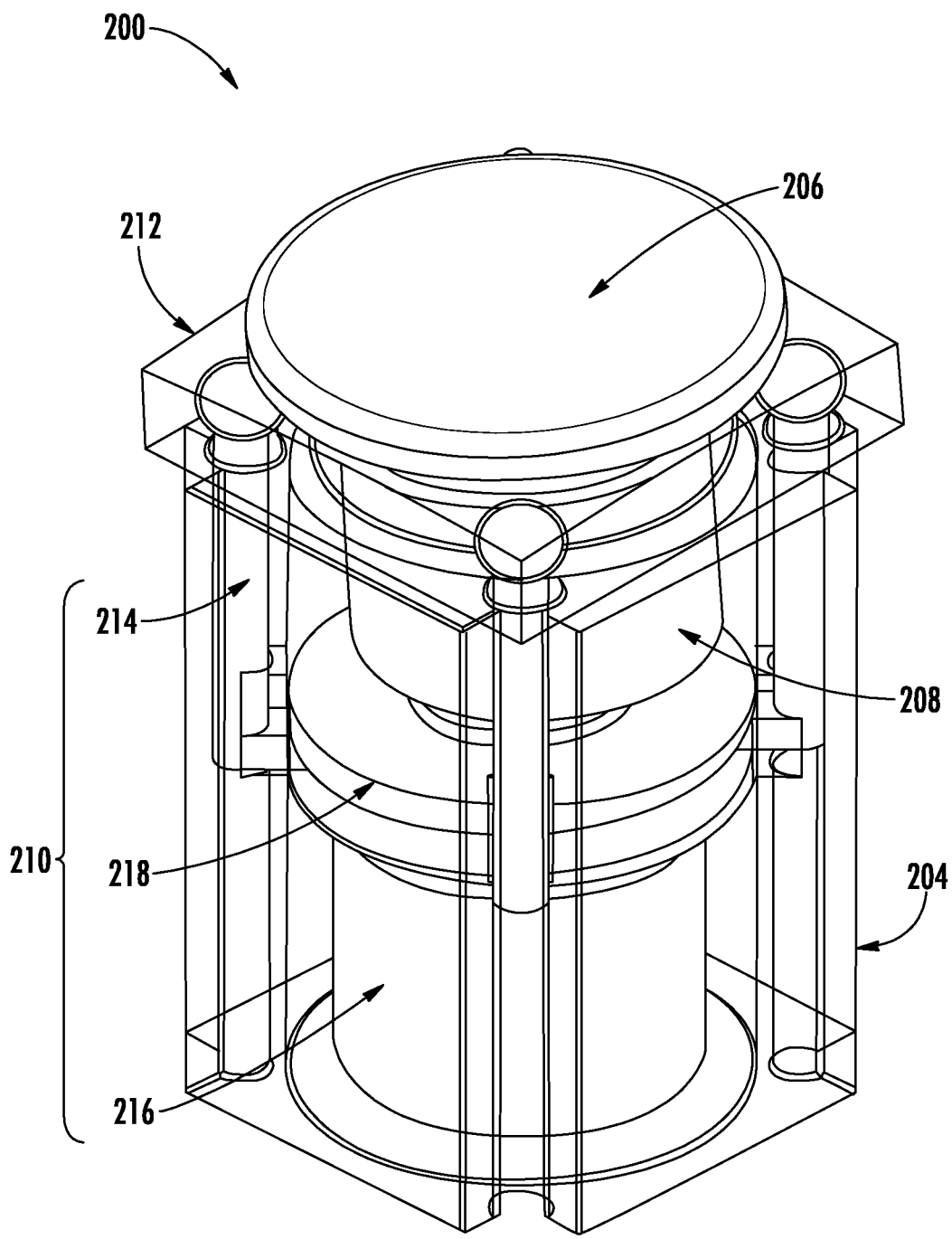
FIG. 2 is a front perspective view of an example conveying module according to an example embodiment.

With reference to FIG. 2, an example conveying module 200 is illustrated. As shown, the conveying module 200 includes a frame 204, an item transport plate 206, a conveying drive motor 208, and a tilt adjustment mechanism 210. As shown, the frame 204 of the conveying module 200 is at least substantially rigid and formed so as to support one or more of the item transport plate 206, the conveying drive motor 208, and/or one or more elements of the tilt adjustment mechanism 210. The item transport plate 206, as further shown in the plurality of conveying modules of FIG. 1, is configured to support one or more items (e.g., items 101 of FIG. 1) received thereon during operation of the conveying table 100. In some embodiments, the item transport plate 206 may be formed as a circular disk such that rotation of the item transport plate 206 as described hereafter does not impede movement of item transport plates of adjacent conveying modules in a plurality of conveying modules. The circular disk of the illustrated embodiment is a solid disk, having at least substantially equivalent surface characteristics across the entire surface area within the perimeter of the solid disk. It should be understood that in various embodiments, however, the circular disk may have a hollow center (analogous to that illustrated in FIG. 4, for example). Although illustrated and described herein with reference to a circular disk, the present disclosure contemplates that the item transport plate 206 may be dimensioned (e.g., sized and shaped) based upon the intended application of the conveying module 200. In some further embodiments, the item transport pate 206 may be formed of a co-injected polymer (e.g., via a co-injection process).

As is evident by the application of the item transport plate 206 in reorienting and redirecting items, the item transport plate 206 may also be formed of a material (e.g., polymer, ceramic, plastic, etc.) having a sufficient coefficient of friction such that the item transport plate 206 may frictionally engage the items 101. To further facilitate engagement between the item transport plate 206 and the items 101, the edges of the item transport plate 206 (e.g., a circular disk) may be beveled, chamfered, filleted, or otherwise angled or rounded. Said differently, due to the item transport plate's 206 tilting position (i.e., at any time the item transport plate 206 remains tilted relative the frame 204), the edges of the circular disk shape may be filleted to allow for rolling engagement with items 101 (e.g., turning of the items 101) received by the conveying module 200. In some embodiments, the item transport plate 206 may include a rigid base or equivalent surface configured to engage (e.g., via connectors, fasteners, or the like) the first drive shaft (not shown) of the conveying drive motor 208. Furthermore, the polymer (e.g., having the frictional characteristics described above) may be molded or otherwise attached to the rigid base such that the polymer at least partially covers the rigid base. As described above, the item transport plate 206 may frictionally engage one or more items such that, over time, this contact deteriorates the frictional engagement between these elements (e.g., the molded polymer deteriorates). As such, the item transport plate 206 may be removable from the conveying module 200 by, for example, disconnecting the fasteners connecting the item transport plate 206 to the conveying drive motor 208.

With continued reference to FIG. 2, the conveying drive motor 208 is supported by the frame 204 such that, in some embodiments, the conveying drive motor 208 is at least partially enclosed (e.g., surrounded by) the frame 204. The conveying drive motor 208 is further operably coupled to the item transport plate 206 and configured to cause rotation of the item transport plate 206 above the conveying drive motor via a first drive shaft (not shown) as described hereafter. The conveying drive motor 208 may be an alternating current (AC) brushless motor, a direct current (DC) bushed motor, a DC brushless motor, a direct drive motor, linear motor, servo motor, stepper motor, and any equivalent mechanism for imparting rotation or otherwise driving operation of the item transport plate 206. During operation, the conveying drive motor 208 may cause rotation of the item transport plate 206 such that items (e.g., items 101 in FIG. 1) supported by the item transport plate 206 are rotated or otherwise moved by the item transport plate 206.

Figure 3:
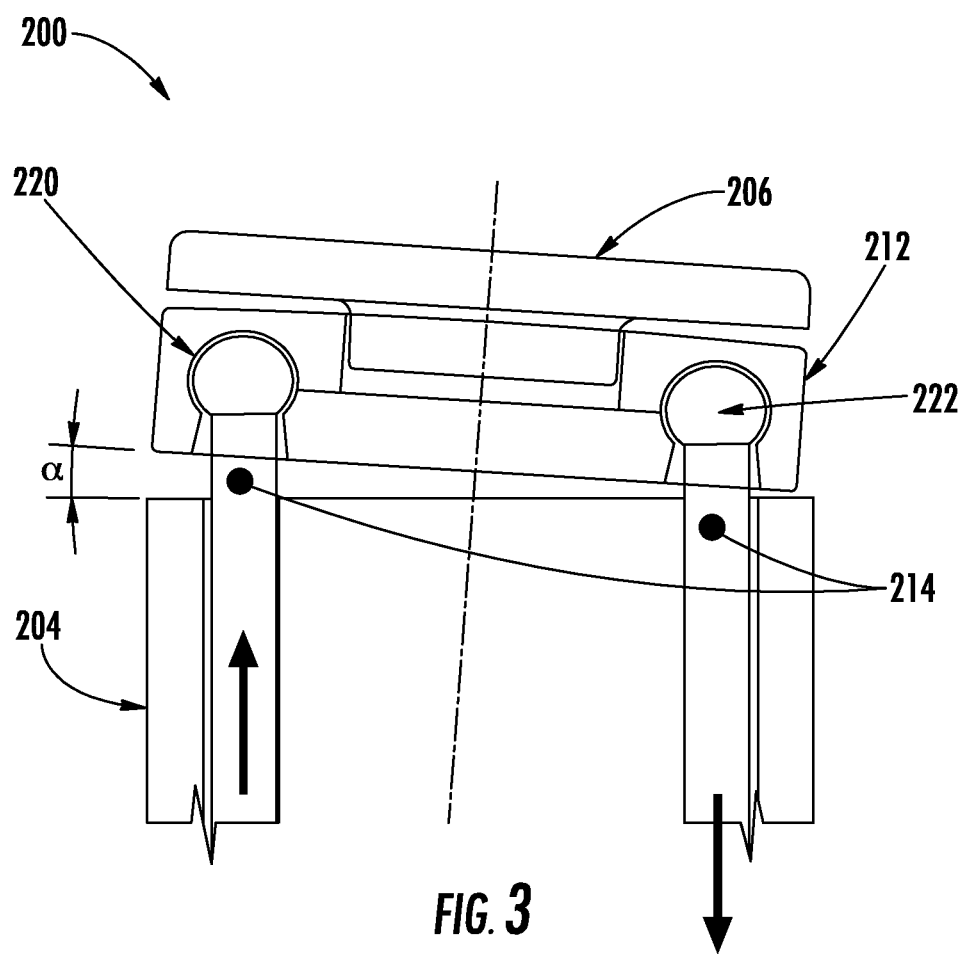
FIG. 3 is a cross-sectional view of a portion of the conveying module of FIG. 2 according to an example embodiment.

In some embodiments, the frame 204 of the conveying module 200 may further include a swivel surface 212 supporting the item transport plate and configured to, as described hereafter with reference to FIG. 3, tilt relative the frame 204. In the conveying module 200 of FIGS. 2-3, the tilt adjustment mechanism 210 includes a tilt drive mechanism 216 supported by the frame 204 and configured to control operation of the tilt adjustment mechanism 210. In such an embodiment, the tilt drive mechanism 216 may be an alternating current (AC) brushless motor, a direct current (DC) bushed motor, a DC brushless motor, a direct drive motor, linear motor, servo motor, stepper motor, and any equivalent mechanism for driving operation of the tilt adjustment mechanism 210. In some embodiments, the tilt drive mechanism 216 may further include a second drive shaft (not shown) as described hereafter that is co-linear with the first drive shaft (not shown) of the conveying drive motor 208. Said differently, the tilt drive mechanism 216 may be supported by the frame 204 such that the tilt drive mechanism 216 and the conveying drive motor 208 are substantially aligned.

With continued reference to FIG. 2, the tilt adjustment mechanism 210 of the conveying module 200 includes a plurality of pushrods 214 positioned around the conveying drive motor 208 and configured to abut and/or engage (e.g., pivotably engage) the swivel surface 212. Each pushrod 214 may be embodied as an elongated member extending between a lower base end engaging a cam disk and a top end pivotably engaged with a bottom side of the swivel surface 212. In the illustrated embodiment, the top end of each pushrod 214 defines a ball configured to engage a corresponding socket defined within the bottom side of the swivel surface 212 so as to enable multiple degrees of rotational freedom of the pushrod 214 relative to the swivel surface 212. The pushrods 214 may be movable linearly along a vertical direction, for example, based on the movement of the cam disk 218 as discussed below. Said differently, the frame 204 may define a plurality of channels (e.g., trenches, recesses, or the like) each configured to receive one of the plurality of pushrods 214 therein and to allow the plurality of pushrods to translate relative the frame 204. Although illustrated and described herein with reference to four (4) pushrods 214 equally spaced by the frame 204 around the item transport plate 206, the present disclosure contemplates that the conveying module 200 may include any number of pushrods 214 so long as the tilting operations described herein with reference to FIGS. 2-3 may be performed. The tilt adjustment mechanism 210 further includes a cam disk 218 attached to the tilt drive mechanism 216. The cam disk 218 of the illustrated embodiment defines a generally planar bottom surface (attached relative to the tilt drive mechanism 216), and a generally planar top surface that is skew (non-parallel) with the bottom surface. Said differently, the plane of the top surface of the cam disk 218 forms an acute angle relative to the plane of the bottom surface of the cam disk 218, such that one point on an edge of the top surface of the cam disk is higher than a point directly opposite (i.e., along the same diameter) and on the edge of the top surface of the cam disk. The cam disk 218 is configured such that when rotated by the tilt drive mechanism 216, the cam disk is configured to cause one or more of the plurality of pushrods 214 to translate relative the frame 204. Specifically, as a higher point of the top surface of the cam disk 218 moves to a particular pushrod 214, that pushrod 214 translates upwards, thereby tilting the swivel surface 212 (and tilting the item transport plate 206). By extension, as a lower point on the top surface of the cam disk 218 moves to a particular pushrod 214, the pushrod translates downwards, thereby tilting the swivel surface 212 (and tiling the item transport plate 206). In certain embodiments, the cam disk 218 (and tilt drive mechanism 216) is indexed, thereby providing signals indicative of the current tilt angle of the swivel surface 212, thereby enabling a determination of which direction the item transport plate 206 is configured to move an item relative to the conveying module 200.

As illustrated in FIG. 3, the translation of one or more of the plurality of pushrods 214 may displace the swivel surface 212 of the frame 204 such that the item transport plate 206 tilts relative the frame 204. The cam disk 218 may be attached to the tilt drive mechanism 216 via the second drive shaft (not shown) such that the cam disk 218 rotates about the tilt drive mechanism 216. Although illustrated and described herein with reference to a disk shape, the present disclosure contemplates that the cam disk 218 may refer to any mechanical linkage configured to transform rotary motion (e.g., output by the tilt drive mechanism 216) into linear motion (e.g., of one or more of the plurality of pushrods 214). As discussed above, the cam disk 218 may be shaped so as to impart any translation of the pushrods 214 based upon the intended application of the conveying module 200.

With reference to FIG. 3, a cross-sectional view of the conveying module 200 is shown to illustrate the tilting operation of the tilt adjustment mechanism 210. As shown, the swivel surface 212 and item transport plate 206 may be configured such that the item transport plate 206 may rotate freely relative to the swivel surface 212 (e.g., rotation via the first drive shaft (not shown) of the conveying drive motor 208). The swivel surface 212, however, may also be configured to contact at least a portion of the item transport plate 206 such that pivoting movement of the swivel surface 212 relative the frame 204 imparts a similar tilt to the item transport plate 206. In order to connect with the tilt drive mechanism 216, the swivel surface 212 may further define a plurality of bearing cups 220 configured to receive a corresponding rounded end 222 of each respective pushrod of the plurality of pushrods 214. As shown, rotation of the cam disk 218 by the tilt drive mechanism 216 in FIG. 2, causes one or more of the pushrods 214 to translate relative the frame 204. This translation causes the swivel surface 212 to tilt relative the frame such that an angle $\alpha$ is formed between the swivel surface 212 and the frame 204. As illustrated, the angle $\alpha$ between the frame 204 and the swivel surface 212 at one pushrod 214 (e.g., an increased distance between the frame 204 and the swivel surface 212) results in a reduced distance between the swivel surface 212 and the frame at an opposing pushrod 214.

Figure 4:
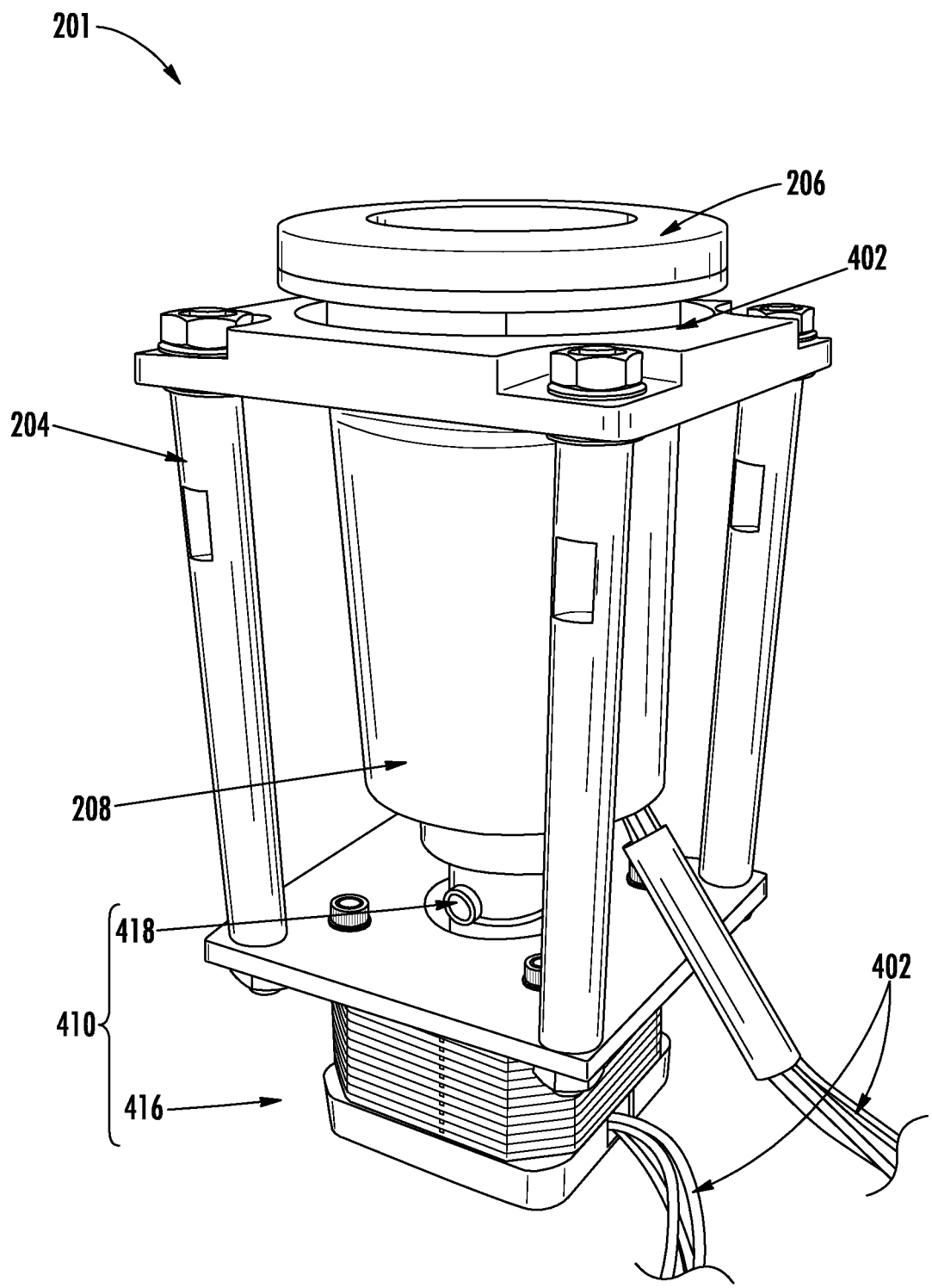
FIG. 4 is a front perspective view of another example conveying module according to an example embodiment.
Figure 5:
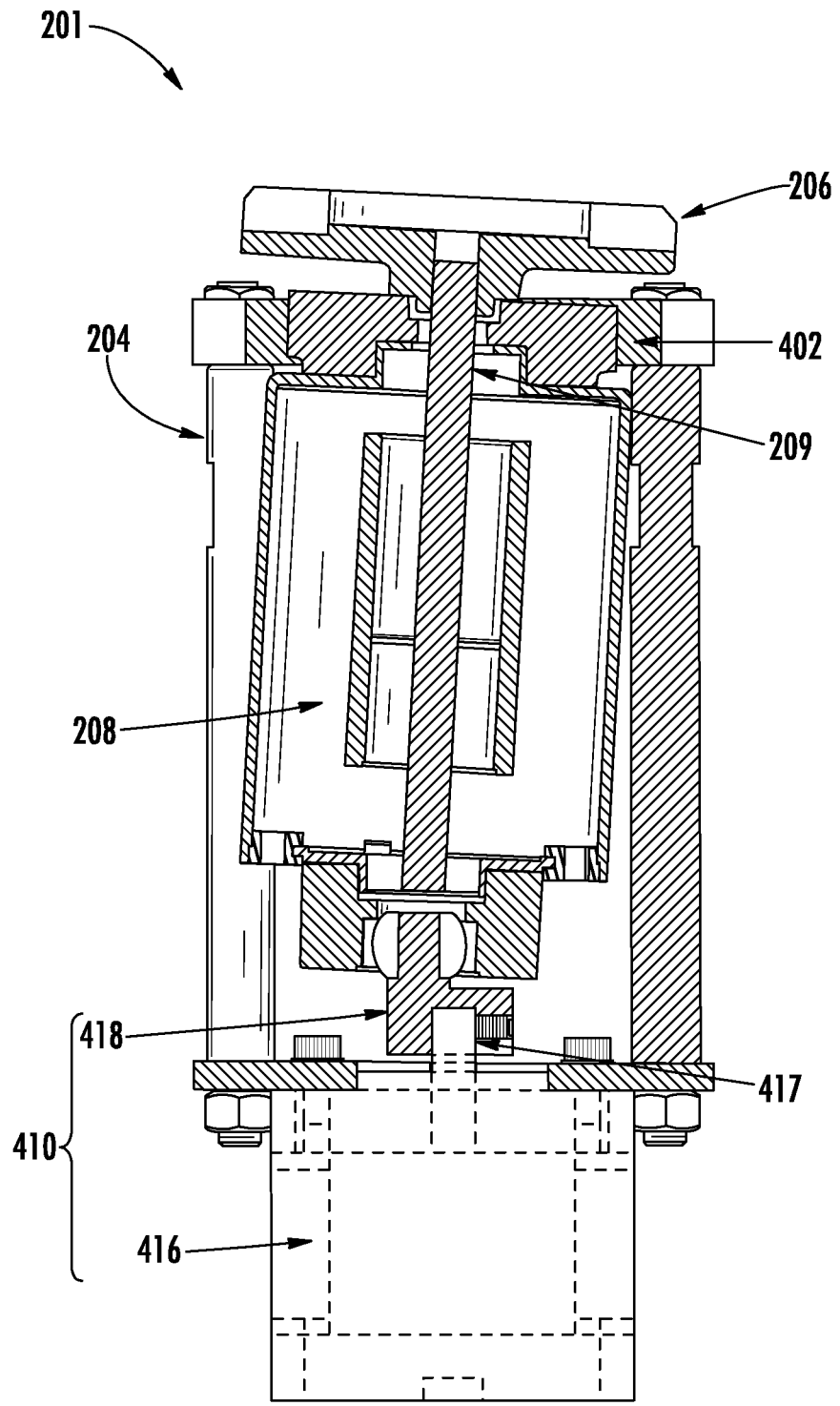
FIG. 5 is cross-sectional view of the conveying module of FIG. 4 according to an example embodiment.

With reference to FIGS. 4-5, a conveying module 201 for item transport is illustrated. As shown, the conveying module 201 includes a frame 204, an item transport plate 206, a conveying drive motor 208, and a tilt adjustment mechanism 410. Similar to the conveying module 200 described with reference to FIGS. 2-3, the frame 204 of the conveying module 201 is formed so as to support one or more of the item transport plate 206, the conveying drive motor 208, and/or one or more elements of the tilt adjustment mechanism 410. The item transport plate 206 is configured to support one or more items (e.g., items 101 of FIG. 1) received thereon during operation of the conveying table 100 and may be formed as a circular disk. The item transport plate 206 may have a configuration similar to that discussed above in reference to FIG. 2. The conveying drive motor 208 is also supported by the frame 204 such that the conveying drive motor 208 is at least partially enclosed (e.g., surrounded by) the frame 204. The conveying drive motor 208 is operably coupled to the item transport plate 206 and configured to cause rotation of the item transport plate 206 via a first drive shaft 209 as described hereafter with reference to FIG. 5. During operation, the conveying drive motor 208 may cause rotation of the item transport plate 206 such that items (e.g., items 101 in FIG. 1) supported by the item transport plate 206 are rotated or otherwise moved by the item transport plate 206.

The conveying module 201 also includes a tilt adjustment mechanism 410 configured to adjust a tilt direction of the item transport plate 206 relative to the frame 204. The tilt adjustment mechanism 410 includes a tilt drive mechanism 216 configured to control operation of the tilt adjustment mechanism 410. Similar to the tilt adjustment mechanism 216 of the conveying module 200, the tilt drive mechanism 416 may be an alternating current (AC) brushless motor, a direct current (DC) bushed motor, a DC brushless motor, a direct drive motor, linear motor, servo motor, stepper motor, and any equivalent mechanism for driving operation of the tilt adjustment mechanism 410. The tilt drive mechanism 416 may further include a second drive shaft 417 illustrated in FIG. 5 and may be supported by the frame 204 such that the tilt drive mechanism 416 is located at least partially outside of the frame 204. As illustrated, the tilt drive mechanism 416 may be positioned exterior of the frame 204 opposite the item transport plate 206.

As described hereafter with reference to FIG. 5, the tilt adjustment mechanism 416 also includes an eccentric joint 418 configured to connect the conveying drive motor 208 to the tilt drive mechanism 416 such that an axis of rotation of a first drive shaft (e.g., first drive shaft 209 in FIG. 5) of the conveying drive motor 208 is offset from an axis of rotation of a second drive shaft (e.g., second drive shaft 417 in FIG. 5) of the tilt drive mechanism 416. Furthermore, each of the conveying drive motor 208 and the tilt drive mechanism 416 may, in some embodiments, be operably coupled to one or more controllers, processors, computing devices, or the like (not shown) via wire harnesses 402. In such an embodiment, one or more of the conveying drive motor 208 or the tilt drive mechanism 416 may receive instructions, commands, signals, etc. from such a computing device that controls operation of the conveying drive motor 208 or the tilt drive mechanism 416. In other embodiments, the wire harnesses 408 may operate only to supply electrical power to the conveying drive motor 208 or the tilt drive mechanism 416.

With reference to FIG. 5, a cross-sectional view of the conveying module 201 is shown to illustrate the tilting operation of the tilt adjustment mechanism 410. As shown, the conveying drive motor 208 defines a first drive shaft 209 that is operably coupled to the item transport plate 206. The first drive shaft 209 rotates so as to, in operation, rotate the item transport plate 206 as described above. The tilt drive mechanism 416 similarly includes a second drive shaft 417 that, in operation, rotates the eccentric joint 418. As shown, the eccentric joint 418 (e.g., elbow joint, ball and socket joint, etc.) is configured so as to offset the conveying drive motor 208 with respect to the tilt drive mechanism 416. Said differently, the eccentric joint 418 offsets the conveying drive motor 208 such that the axis of rotation of the first drive shaft 209, and by association the axis of rotation of the item transport plate 206, is offset from the axis of rotation of the second drive shaft 417. In some embodiments, the eccentric joint 418 may define ball joint (e.g., rounded rod end or the like) configured to be received by a corresponding socket (e.g., rounded connection) of the conveying drive motor 208. As shown, the ball joint of the eccentric joint 418 is offset relative to the second drive shaft 417 such that the ball shaft's engagement with the corresponding socket of the conveying drive motor 206 causes an offset rotation of the conveying drive motor 208 about the second drive shaft 417.

As the tilt drive mechanism 416 causes rotation of the second drive shaft 417, the eccentric joint 418 causes rotation of the conveying drive motor 208. Given that the end of the conveying drive motor 208 proximate the item transport plate 206 is centered by the frame over the tilt drive mechanism 416, as the eccentric joint 418 rotates about the second drive shaft 417, the tilt adjustment mechanism 410 adjusts a tilt direction of the item transport plate 206 relative to the frame 204 (e.g., the item transport plate 206 tilts relative to the frame 204). In certain embodiments, the eccentric joint 418 (and the tilt drive mechanism 416) is indexed so as to provide signals indicative of the current tilt angle of the conveying drive motor 208 and attached item transport plate 206. This index may enable a determination of which direction the item transport plate 206 is configured to move an item relative to the conveying module 201.

With continued reference to FIG. 5, in some embodiments, the frame 204 further comprises a deformable bearing 402 supporting an end of the conveying drive motor 208 proximate the first drive shaft 209. The deformable bearing 402 is further configured to, during operation of the tilt drive mechanism 416, deform such that continuous contact between the frame 204 and the conveying drive motor 208 is maintained via the deformable bearing 402. Said differently, the deformable bearing 402 may operate to flex during operation of the conveyor module 201 to ensure that the frame 204 provides continuous support for the conveying drive motor 208 and the item transport plate 206. The deformable bearing 402 further operates to prevent debris or other unintended materials from entering the frame 204 during operation.

The deformable bearing 402 may also be formed of a co-injected polymer (e.g., via a co-injection process). For example, the deformable bearing 402 and end of the conveying drive motor 208 may be formed of respective polymers such that is the conveying drive motor 208 is relatively harder than the deformable bearing 402 (e.g., the deformable bearing 402 is formed of a relatively softer polymer). By way of a further example, the deformable bearing 402 and the transport plate 206 may be manufactured via a multi-component injection molding process in which two different materials (e.g., polyamide and polyurethane) are processed in a single production cycle. The frame 204 may also be manufactured via a plastic injection molding process. In some embodiments, the frame 204 may comprise fiber-reinforced polyamide.

During operation of a conveying table 100 as illustrated in FIG. 1, a conveying module 200, 201 may be independently operated (e.g., separate from other conveying modules in a plurality of conveying modules). In such an embodiment, the conveying drive motor 208 may be configured to rotate in only a single direction (e.g., clockwise or counterclockwise) but may provide for variable rotational speed. Said differently, in some embodiments, the conveying drive motor 208 may vary the rotational speed of the first drive shaft so as to vary the rotational speed of the item transport plate. Although described herein with reference to a single direction of rotation, the present disclosure contemplates that in some instances the conveying drive motor 208 may be configured to provide rotation in alternating (e.g., clockwise and counterclockwise) directions.

Given that the item transport plate 206 remains tilted as described above, the edge of the item transport plate 206 that is tilted upwards (e.g., at an angle α with the frame 204) will contact the item 101 and, based on the rotational direction of the conveying drive motor 208, will determine the direction in which the conveying module 200, 201 conveys the item 101. In order to alter the conveying direction, an external computing device, controller, or the like may be configured to transmit commands, signals, etc. to the tilt adjustment mechanism 210, 410 to adjust a tilt direction of the item transport plate 206 relative to the frame 204. Said differently, an external computing device may transmit a signal to adjust which edge of the item transport plate 206 is higher in order to adjust the conveying direction of the conveying module 200, 201.

In some embodiments, a plurality or an array a conveying modules 200, 201 may be collectively operated in order to convey items 101 received by the conveying table 100. In order to alter the conveying direction in such an embodiment, an external computing device, controller, or the like may be configured to monitor the tilt angles α associated with one or more of the item transport plates 206 and transmit commands, signals, etc. to the tilt adjustment mechanisms 210, 410 of a plurality of conveying modules 200, 201 to adjust a tilt direction of one or more item transport plates 206 relative to their respective frames 204. For example, an external computing device may monitor tilt angle data associated with each conveying module 200, 201 in a plurality of conveying modules and, based on the tilt angle data may transmit one or more signals to adjust various edge of the item transport plates 206 in the plurality of conveying modules 200, 201 in order to adjust the conveying direction of the conveying table 100 and/or to reorient (e.g. spin or the like) the item 101. In some embodiments, various conveying modules 200, 201 may be linked such that relative movement of one conveying module 200, 201 may cause associated movement of another conveying module 200, 201.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A conveying module for item transport, the conveying module comprising:
a frame;
an item transport plate configured to support one or more items received thereon;
a conveying drive motor supported by the frame and operably coupled to the item transport plate, wherein the conveying drive motor is configured to cause rotation of the item transport plate about the conveying drive motor; and
a tilt adjustment mechanism configured to adjust a tilt direction of the item transport plate relative to the frame.

2. The conveying module according to claim 1, wherein the tilt adjustment mechanism further comprises:
a tilt drive mechanism, wherein the tilt drive mechanism is configured to control operation of the tilt adjustment mechanism; and
an eccentric joint configured to connect the conveying drive motor to the tilt drive mechanism such that an axis of rotation of a first drive shaft of the conveying drive motor is offset from an axis of rotation of a second drive shaft of the tilt drive mechanism.

3. The conveying module according to claim 2, wherein the frame further comprises a deformable bearing supporting an end of the conveying drive motor proximate the first drive shaft.

4. The conveying module according to claim 3, wherein the deformable bearing is further configured to, during operation of the tilt drive mechanism, deform such that continuous contact between the frame and the conveying drive motor is maintained via the deformable bearing.

5. The conveying module according to claim 1, wherein the frame further comprises a swivel surface supporting the item transport plate.

6. The conveying module according to claim 5, wherein the tilt adjustment mechanism further comprises a plurality of pushrods positioned around the conveying drive motor and configured to abut the swivel surface, wherein the swivel surface further comprises a plurality of bearing cups each configured to receive a corresponding rounded end of a respective pushrod of the plurality of pushrods.

7. The conveying module according to claim 6, further comprising:
a tilt drive mechanism, wherein the tilt drive mechanism is configured to control operation of the tilt adjustment mechanism,
wherein the tilt adjustment mechanism further comprises a cam disk attached to the tilt drive mechanism, wherein the cam disk is shaped such that, when rotated by the tilt drive mechanism, the cam disk is configured to cause one or more of the plurality of pushrods to displace the swivel surface of the frame such that the item transport plate tilts relative the frame.

8. The conveying module according to claim 6, wherein a first drive shaft of the conveying drive motor and a second drive shaft of the tilt drive mechanism are co-linear.

9. The conveying module according to claim 1, wherein the item transport plate comprises a circular disk formed of a co-injected polymer.

10. A conveying table for item transport, the conveying table comprising:
a plurality of conveying modules, wherein one or more of the plurality of conveying modules comprise:
a frame;
an item transport plate configured to support one or more items received thereon;
a conveying drive motor supported by the frame and operably coupled to the item transport plate, wherein the conveying drive motor is configured to cause rotation of the item transport plate about the conveying drive motor; and
a tilt adjustment mechanism configured to adjust a tilt direction of the item transport plate relative to the frame,
wherein the plurality of conveying modules are configured to collectively convey items received by the conveying table.

11. The conveying table according to claim 10, wherein the tilt adjustment mechanism further comprises:
a tilt drive mechanism, wherein the tilt drive mechanism is configured to control operation of the tilt adjustment mechanism; and
an eccentric joint configured to connect the conveying drive motor to the tilt drive mechanism such that an axis of rotation of a first drive shaft of the conveying drive motor is offset from an axis of rotation of a second drive shaft of the tilt drive mechanism.

12. The conveying table according to claim 11, wherein the frame further comprises a deformable bearing supporting an end of the conveying drive motor proximate the first drive shaft.

13. The conveying table according to claim 12, wherein the deformable bearing is further configured to, during operation of the tilt drive mechanism, deform such that continuous contact between the frame and the conveying drive motor is maintained via the deformable bearing.

14. The conveying table according to claim 10, wherein the frame further comprises a swivel surface supporting the item transport plate.

15. The conveying table according to claim 14, wherein the tilt adjustment mechanism further comprises a plurality of pushrods positioned around the conveying drive motor and configured to abut the swivel surface, wherein the swivel surface further comprises a plurality of bearing cups each configured to receive a corresponding rounded end of a respective pushrod of the plurality of pushrods.

16. The conveying table according to claim 15, further comprising:
   a tilt drive mechanism, wherein the tilt drive mechanism is configured to control operation of the tilt adjustment mechanism,
   wherein the tilt adjustment mechanism further comprises a cam disk attached to the tilt drive mechanism, wherein the cam disk is shaped such that, when rotated by the tilt drive mechanism, the cam disk is configured to cause one or more of the plurality of pushrods to displace the swivel surface of the frame such that the item transport plate tilts relative the frame.

17. The conveying table according to claim 15, wherein a first drive shaft of the conveying drive motor and a second drive shaft of the tilt drive mechanism are co-linear.

18. The conveying table according to claim 10, wherein the item transport plate comprises a circular disk formed of a co-injected polymer.

19. A method of manufacturing a conveying module for item transport, the method comprising:
   providing a frame;
   providing an item transport plate configured to support one or more items received thereon;
   providing a conveying drive motor supported by the frame and operably coupled to the item transport plate, wherein the conveying drive motor is configured to cause rotation of the item transport plate about the conveying drive motor; and
   providing a tilt adjustment mechanism configured to adjust a tilt direction of the item transport plate relative to the frame.

20. The method according to claim 19, wherein providing the tilt adjustment mechanism further comprises:
   providing a tilt drive mechanism, wherein the tilt drive mechanism is configured to control operation of the tilt adjustment mechanism; and
   providing an eccentric joint configured to connect the conveying drive motor to the tilt drive mechanism such that an axis of rotation of a first drive shaft of the conveying drive motor is offset from an axis of rotation of a second drive shaft of the tilt drive mechanism.

* * * * *